United States Patent
Hwang et al.

(10) Patent No.: US 7,242,812 B2
(45) Date of Patent: Jul. 10, 2007

(54) CODING AND DECODING OF VIDEO DATA

(75) Inventors: Wen-Liang Hwang, Taipei (TW); Jian-Liang Lin, Taipei (TW)

(73) Assignee: Academia Sinica, Taipei (TW)

( * ) Notice: Subject to any disclaimer, the term of this patent is extended or adjusted under 35 U.S.C. 154(b) by 791 days.

(21) Appl. No.: 10/603,620

(22) Filed: Jun. 26, 2003

(65) Prior Publication Data

US 2004/0264792 A1 Dec. 30, 2004

(51) Int. Cl.
*G06K 9/36* (2006.01)
*G06K 9/46* (2006.01)

(52) U.S. Cl. ............ 382/240; 382/236; 382/237; 382/239; 382/232; 375/240.19; 375/240.03

(58) Field of Classification Search ............ 382/236, 382/237, 239, 240, 232, 233, 305; 375/240.19, 375/240.03, 240.11
See application file for complete search history.

(56) References Cited

U.S. PATENT DOCUMENTS

| 5,724,451 A | * | 3/1998 | Shin et al. | 382/240 |
| 5,768,434 A | * | 6/1998 | Ran | 382/240 |
| 5,778,192 A | * | 7/1998 | Schuster et al. | 709/247 |

OTHER PUBLICATIONS

Ralph Neff et. al., *Decoder Complexity and Performance Comparison Of Matching Pursuit and DCT-Based MPEG-4 Video Codecs*, 1998, pp. 783-787, IEEE.

Martin Vetterli et. al., *Matching Pursuit For Compression And Application To Motion Compensated Video Coding*, 1994, pp. 725-729, IEEE.

Christophe De Vleeschoouwer et. al., *SNR Scalability Based On Matching Pursuits*, 2000, pp. 198-208, IEEE Transactions On Multimedia, Vo. 2, No. 4, Dec. 2000.

Ralph Neff et. al., *Very Low Bit-Rate Video Coding Based On Matching Pursuits*, 1997, pp. 158-171, IEEE Transactions On Circuits And Systems For Video Technology, vol. 7, No. 1, Feb. 1997.

Osama K. Al-Shaykh et. al., *Video Compression Using Matching Pursuits*, 1999, pp. 123-143, IEEE Transactions On Circuits And Systems For Video Technology, vol. 9, No. 1, Feb. 1999.

* cited by examiner

Primary Examiner—Matthew C. Bella
Assistant Examiner—Ali Bayat
(74) Attorney, Agent, or Firm—Bacon & Thomas, PLLC

(57) ABSTRACT

A novel method for coding and decoding video data and codec thereof are disclosed. The invented method provides an FGS (fine grained scalability) algorithm using bit plane coding technique. While conducting the bit plane encoding, the spatial and temporal dependence between bit planes is used to exploit the redundancy in the bit planes. In the embodiment of this invention, the bit plains are represented by quadtrees and bit plane prediction is made to remove the spatial and temporal redundancy in a video. The scalability of the video data is fine grained since atoms of the motion residuals do not have to be grouped as coding units.

16 Claims, 4 Drawing Sheets

Fig. 4

CODING AND DECODING OF VIDEO DATA

FIELD OF THE INVENTION

The present invention relates to a method for coding and decoding of video data, especially to bit plane coding and decoding of video data after being processed with matching pursuit.

BACKGROUND OF THE INVENTION

As the development of multimedia application grows, video data transmission techniques have been gradually changing from one-to-one (simulcast) communication to one-to-many (multicast) communication.

Due to the channel capacity variation and the disparate requirement for different receivers, it is necessary to develop video coding and transmission techniques that are efficient and scalable to the Internet heterogeneity. Although representing a video with multiple redundancy in different bit rates is a simple solution used to realize multicast in most of commercial systems, this approach is not efficient and cannot cope smoothly with the channel capacity variation. In contrast, video scalability is a better solution that generates a single bit stream for all intended recipients and the decoder of each recipient can reconstruct the video with different quality within a specific bit rate range. Depending on the specification of receivers, a scalable system can support scalability either in frame rate ("temporal scalability"), in frame resolution ("spatial scalability"), in frame quality ("SNR scalability"), or a hybrid of these ("hybrid scalability"). Despite the fact that many scalable coding methods have been developed in recent years, they are still considered less efficient, especially when they are used at low bitrate applications. Most existing systems use the hybrid motion-compensated DCT for video coding. Although the hybrid motion-compensation algorithm may not be the best solution for video scalability, the hybrid scheme is simple and has low delays in performing the frame prediction.

Vetterli and Kalker translated the motion compensation and DCT hybrid video coding into matching pursuits. See M. Vetterli and T. Kalker, "Matching pursuit for compression and application to motion compensated video coding", *Proc. ICIP*, November 1994, pp. 725–729. They encode frames by the matching pursuit algorithm with a dictionary composed of motion blocks and DCT bases. Neff and Zakhor used matching pursuits to represent the motion residual image. See R. Neff and A. Zakhor, "Very low bit-rate video coding based on matching pursuits", *IEEE Trans. Circuits Syst. Video Technol.*, vol. 7, pp. 158–171, February 1997.

According to their design, using matching pursuits in coding the residuals attains performances better than those of DCT in terms of PSNR and perceptual quality at low bit rates. It is indicated in R. Neff, T. Nomura and A. Zakhor's "Decoder Complexity and Performance Comparison of Matching Pursuit and DCT-Based MEPG-4 Video Codecs", *Proc. IEEE Int. Conf Image Processing.*, pp. 783–787, 1998, that a post processing in removing blocky and ringing artifacts is required at the decoder to achieve a reasonable quality at low bit rates, if DCT is used in encoding motion residuals. Note that post processing is not required at a decoder for the same quality, if the residuals are encoded by matching pursuits. Thus, coding motion residuals with matching pursuits yields less decoder complexity.

Certain SNR-scalable schemes based on matching-pursuits have been proposed. Al-Shaykh et al. disclosed a fine grained scalability (FGS) coding algorithm which can produce a continuous bit stream with increasing SNR. See O. Al-Shaykh, E. Miloslavsky, T. Nomura, R. Neff, and A. Zakhor, "Video compression using matching pursuits", *IEEE Trans. Circuits Syst. Video Technol.*, vol. 9, no. 1, pp. 123–143, February 1999. However, this codec must encode at least 5 atoms as a unit at a time in order to attain a better coding efficiency of atom positions. Thus, a better coding efficiency of atom positions is obtained at the expense of sacrificing the FGS property. The scheme proposed by Vleeschouver et al. used two residuals as coarse scalability. See C. D. Vleeschouwer and B. Macq, "SNR scalability based on matching pursuits", *IEEE Trans. on Multimedia*, vol. 2, No. 4, 2000, pp. 198–208.

OBJECTIVES OF THE INVENTION

The objective of this invention is to provide a novel method for coding and decoding of video data.

Another objective of this invention is to provide a method for coding and decoding video data with fine grained scalability.

Another objective of this invention is to provide a method for coding and decoding video data based on bit plane coding of motion residuals under matching pursuit processing.

Another objective of this invention is to provide a method for quadtree coding and decoding video data based on bit plane coding of motion residuals under match pursuit processing.

Another objective of this invention is to provide a codec using the above methods.

SUMMARY OF THE INVENTION

According to this invention, a novel method for coding and decoding video data and codec thereof are disclosed. The invented method provides an FGS (fine grained scalability) algorithm using bit plane coding technique. While conducting the bit plane coding, the spatial and temporal dependence between bit planes is used to exploit the redundancy in the bit planes. In the embodiment of this invention, the bit plains are represented by quadtrees and bit plane prediction is made to remove the spatial and temporal redundancy in a video. The scalability of the video data is fine-grained since atoms of the motion residuals do not have to be grouped as coding units.

These and other objectives and advantages of this invention may be clearly understood from the detailed description by referring to the following drawings.

BRIEF DESCRIPTION OF THE DRAWINGS

FIG. 4(a) shows the quadtree of a bit plane to be processed, FIG. 4(b) shows the quadtree of its previous bit plane and FIG. 4(c) shows the result of the exclusive OR of (a) and (b).

DETAILED DESCRIPTION OF THE INVENTION

In this invention, a novel method for coding and decoding video data the its codec are disclosed. The invented method provides a fine grained scalability (FGS) algorithm using bit plane coding technique. Frames of video data are estimated and residuals are generated. The residuals are encoded by the bit plane coding technology and the bit planes of the residuals are represented by quadtrees. In encoding the residuals, the residuals are divided into two layers, the base layer and the enhanced layer, respectively. Spatial and temporal interdependence between bit planes in their quadtrees is used to conduct efficient low bitrate encoding. While most significant atoms are first found, the invented method provides fine grained scalability in decoding the video bit streams.

The primary requirement for the video streaming technology is scalability. A scalable video stream can be viewed by a large amount of users simultaneously, despite of the variation in the channel capacity and the disparate requirement for respective user systems. Among the scalable decoding technologies, the "fine grained scalability (FGS)" technology is most popular. An FGS framework basically provides two layers of services, the base layer and the enhanced layer. The data in the base layer include a motion prediction portion and a residual portion, encoded with high coding efficiency in low bit rates. As a result, the base-layer bit streams are easily transmitted, received and decoded, whereby all users are able to receive video data in base layer at any circumstance.

On the other hand, bit streams belonging to the enhanced layer allow an encoder to enhance the parts in the video frames that convey more content relevant information to users.

Figure 1:
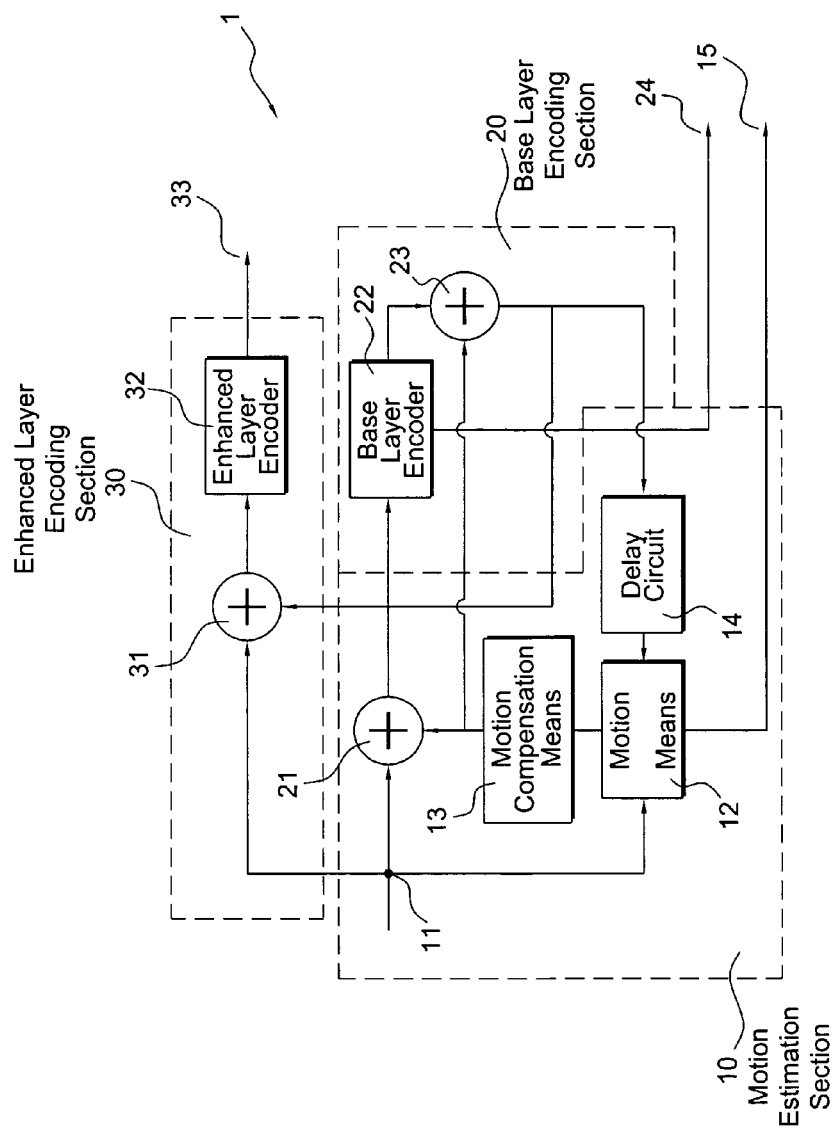
FIG. 1 illustrates the system diagram of a two-layer FGS matching pursuit video encoder.
Figure 2:
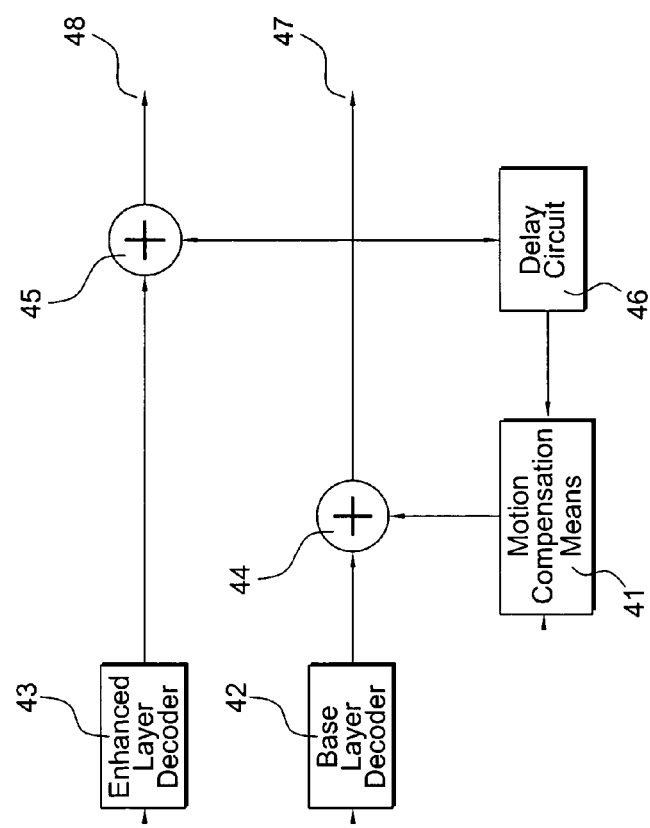
FIG. 2 shows the system diagram of its decoder.

FIG. 1 illustrates the system diagram of a two-layer FGS matching pursuit video encoder and FIG. 2 shows the system diagram of its decoder. As shown in FIG. 1 a two-layer FGS video encoder 1 includes a motion estimation section 10, a base layer encoding section 20 and a enhanced layer encoding section 30. When video data representing a video frame are input to the input node 11 of the encoder 1, the data are transmitted to the motion estimation section 10, to the base layer encoding section 20 through subtracter 21 and to the enhanced layer encoding section 30 through subtracter 31.

Data being transmitted to the motion estimation section 10 is first input to motion estimation means 12, where motion estimation processing is applied to the video data to abstract the motion vectors of the frame. Here, content of the video frame is estimated according to content of the previous video frame. In this motion estimation means 12, any proper technology may be used to estimate the current video frame.

The matching pursuit algorithm has been known to those skilled in the art. In the matching pursuit algorithm, a dictionary of over-complete image bases is provided. The algorithm decomposes an image (or a video flame) into a linear expansion of bases belonging to the dictionary by a succession of greedy steps. The image is first decomposed into an inner product value times a dictionary element and a residual image, wherein the dictionary element together with the inner product value is called an atom. The matching pursuit algorithm then decomposes the residual image by projecting it on a basis function of the dictionary, as was done for the original image. After M iterations, an approximation of the original image can be obtained from the M atoms so obtained.

Since the matching pursuit algorithm is known, detailed description thereof is thus omitted.

After the motion estimation processing, an approximation of the original image is obtained. Motion vectors (inner product value and index of related dictionary atoms if in the case of matching pursuits) are generated and output from the motion vector line 15 to represent the approximate image.

The approximate image as estimated is then given to the motion compensation means 13, wherein necessary compensation is processed to the approximate image. In this step, any proper technology that gives suited compensation to the approximate image may be used. The approximate image as compensated is then sent to subtracter 21, wherein components in the approximate image is subtracted from the original image, whereby a residual image is obtained. The residual image is then given to the base layer encoder 22 of the base layer encoding section 20 for encoding.

Figure 3:
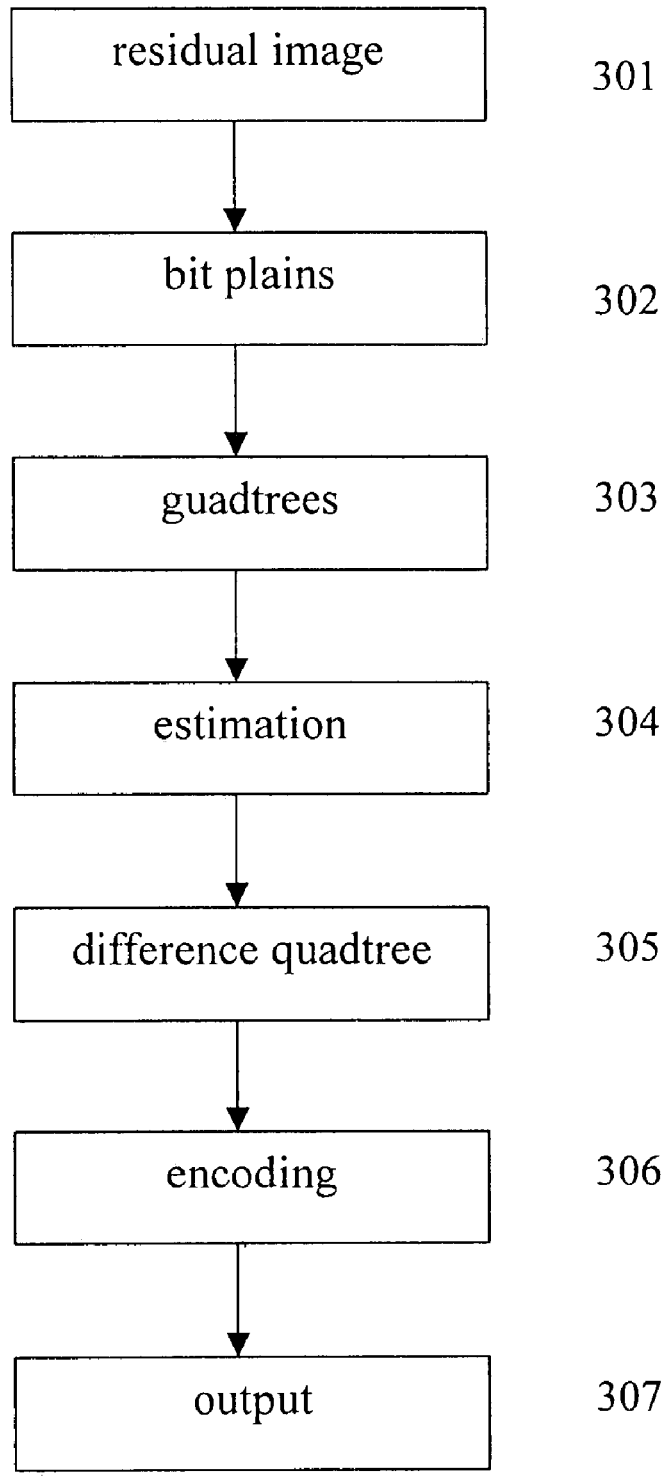
FIG. 3 illustrates the flowchart of the bit plane decoding method of this invention.

In the base layer encoder 22, the residuals are processed in accordance with the bit plane encoding method of this invention. FIG. 3 illustrates the flowchart of the bit plane encoding method of this invention. As shown in FIG. 3, at 301 the residual image is obtained. At 302 the residual image is encoded into its bit planes with a bit plane encoder. After the bit plane encoding, a plurality of bit planes are obtained. In general number of the bit planes is equal to number of bits used to represent an element (such as a pixel) of the residual image. At 303, the bit planes are further processed by a quadtree processor to obtain their quadtree data.

In the bit plane coding technology of this invention, the "temporal prediction" approach is carried out in the base layer and the "spatial prediction" approach is in the enhanced layer. As a result, each bit plane in the enhanced layer of the current frame is predicted from all the previous bit planes in the same frame, while each bit plane in the base layer of the current frame is predicted from the corresponding bit plane of the previous frame. Both the spatial and the temporal bit plane predictions are represented by quadtrees.

Quadtree has been used for image representation at different resolution levels. It is a simple image decomposition algorithm and is used successfully in representing binary images. A bit plane can be represented by a quadtree. The root node of the quadtree represents the entire bit plane. If the entire bit plane has at least one atom, the root node is labeled "1" and four children, representing four quadrants of the bit plane, are then added to the root node; otherwise the root node is labeled "0". This process is applied recursively to each of the four children until each child node represents a single pixel.

At 304 the quadtree of the current bit plane is predicted, using either the quadtree of the corresponding bit plane in the previous frame or the quadtree of the union of all the previous hit planes in the same frame. In this step, it is suggested that for each bit plane, the quadtree of the most significant bit plane is first obtained and the process is conducted towards the least significant bit plane. In the embodiment of this invention, the first bit plane from which quadtree is obtained is the root node. The nodes in the tree are then traversed from the root in the depth-first order.

If the current frame is in the base layer, the current frame is predicted based on the bit planes of the previous frame, whereby the quadtrees of the current bit planes are obtained from the result of exclusive OR on nodes of the current frame and the previous frame. On the other hand, if the current frame is in the enhanced layer, the quadtree corresponding to the bit plane obtained from the union of the bit planes from the following to the most significant ones in the current frame, is used to predict, again by exclusive OR, the quadtree of the current bit planes.

If a terminal node which value is "1" is found, the node will be considered a new atom and the basis index and the sign of the inner product value will be encoded. If a node is not a leaf, then its four children are visited in a depth-first search order.

Figure 4:
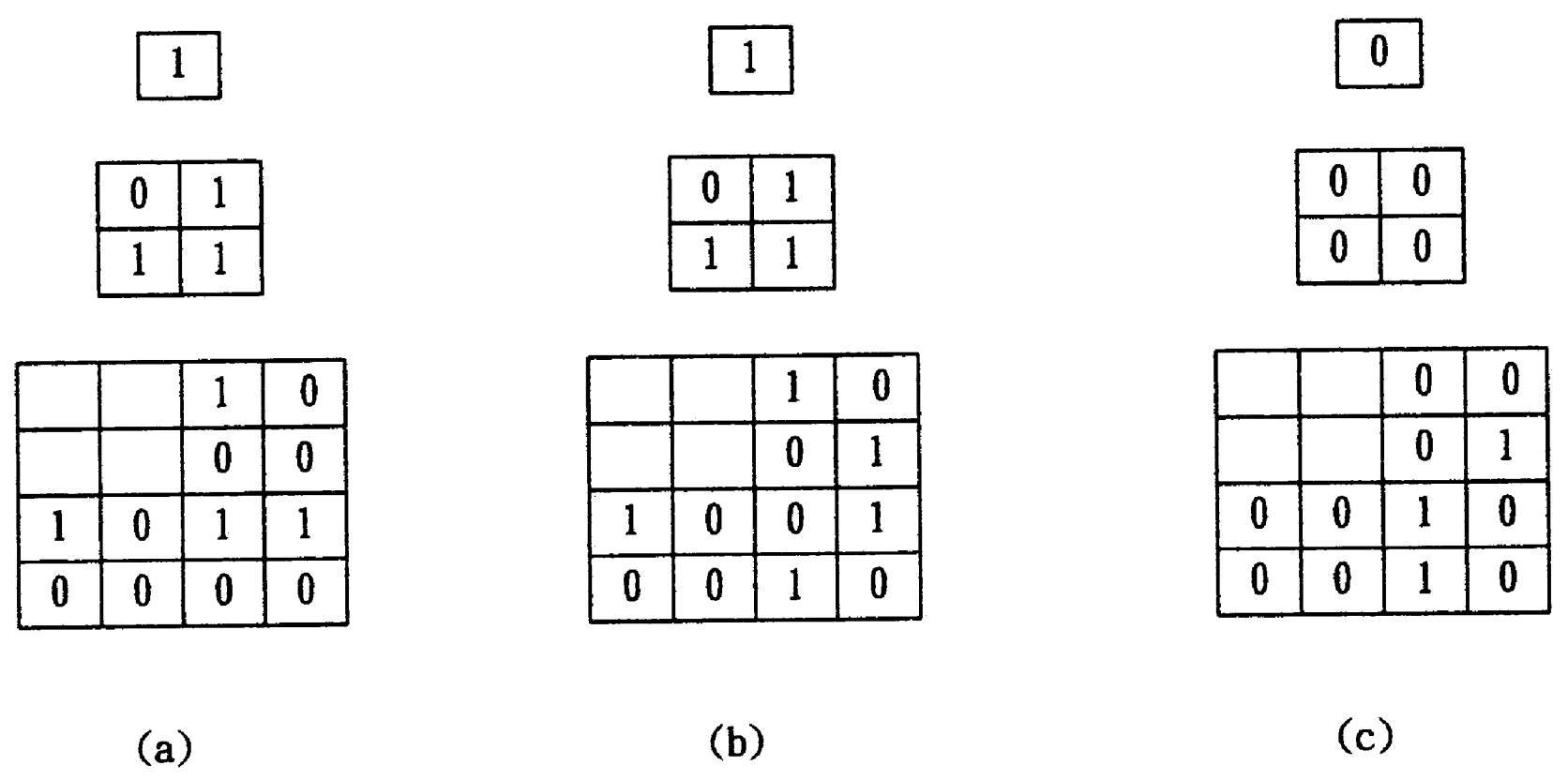

At 305, the difference between the quadtree of the current bit plane and that of the predicted bit plane is calculated, as their "difference quadtree". FIG. 4(*a*) shows the quadtree of the current bit plane, FIG. 4(*b*) shows the quadtree of its previous bit plane and FIG. 4(*c*) shows the result of the exclusive OR of (a) and (b). In this invention, (b) is used to predict (a) and (c) is the difference between (a) and (b). As shown in these figures, the bit patterns at level 0, which represents images with the best resolution, are different in FIG. 4(*a*) and in FIG. 4(*b*). However, at the upper levels of the quadtrees of FIG. 4(*a*) and FIG. 4(*b*), representing images with coarser resolutions, the same bit patterns are found. In other words, the less significant variations of 0's and 1's between the bit planes do not propagate to upper levels. Hence, if two bit planes have a lot of overlappinig in bit patterns, the quadtree of one bit plane may be used to predict the quadtree of the next bit plane efficiently. It has been found that in a video data file, the corresponding bit planes in two consecutive frames and the adjacent bit planes within a frame tend to have many redundant elements. That is to say, due to the interdependence between temporally or spatially consecutive frames, bit planes of consecutive frames will be very similar.

As shown in FIG. 4, the "difference quadtree" (c) is the result of the exclusive OR on the corresponding nodes in (a) and (b). The blanks in the top left corner of all subfigures indicate that the nodes there are not encoded since their parent node has the value of "0". The content of (a) may be recovered by applying exclusive OR on (b) and (c). The difference quadtree is traversed in the depth-first order and then yields the sequence of: 00000000000101100. Since there many 0's in the sequence, the entropy of the difference quadtree is relatively low. Moreover, the symbols used in the sequence are only 0's and 1's. They can be easily encoded through the adaptive arithmetic coding. At 306 both the quadtree of the predicted bit plane and the difference quadtree are encoded and the results are output at 307.

A node at a higher level of a quadtree represents a larger block in the bit plane. As a result, nodes of a higher level tend to have the same values between quadtrees. In other words, nodes at a higher level will have a higher correlation.

Since the difference quadtree is transmitted according to the depth-first search, the decoder dose not need to receive all the atoms in a particular bit plane in order to reconstruct an image. Any atom received so far can be decoded immediately. A fine-grained salability up to each single atom is thus provided.

After being encoded, the quadtrees of the bit planes of the residual video data are given to the base layer output line 24. The result of the encoding is also sent to adder 23 to be added with data as processed by the motion compensation means 13. The result of the adder 23 is then given to a delay circuit 14 to be processed and given to the motion estimation means as reference. The result of the adder 23 is also given to subtracter 31 of the enhanced layer encoding section 30 at which the result of the adder 23 is subtracted from the data coming from the input node 11 to generate the enhanced layer residual data. The enhanced layer residual data are given to the enhanced layer encoder 32 to be encoded. To distinguish the "base layer" and the "enhanced layer", any standard may apply, depending on the needs in the application.

The encoding processing of the enhanced layer encoder 32 is similar to that of the base layer encoder 22. The major difference rests in that the enhanced layer encoder 32 uses basically the "spatial prediction" approach to predict the bit planes of the enhanced layer data. After having been encoded, the result is given to the enhanced layer output line 33. The encoding processing of a frame is thus completed.

At the decoder side, data received include the motion vectors, the base layer bit stream and the enhanced layer bit stream. FIG. 2 illustrates the system diagram of the decoder of the present invention. As shown in this figure, the motion vectors are given to the motion compensation means 41, the base layer bit stream is given to the base layer decoder 42 and the enhanced layer bit stream is given to the enhanced layer decoder 43. The motion vectors are processed by the motion compensation means 41 to generate estimated video frame and sent to adder 44, where the estimated video frame is added with the result of processing of the base layer bit stream by the base layer decoder 42. The result so generated represents the base layer video data and is given to the base layer video output line 47. The base layer video data are also given to delay circuit 46, whereby the base layer video data may be used as reference by the motion compensation means 41. The base layer video data are also given to adder 45, to be added with enhanced layer residuals generated by enhanced layer decoder 43 to generate enhanced layer video data, which is given to the enhanced layer video output line 48.

Experiments showed that the method of this invention can achieve a 1 to 2 bits reduction in encoding atom positions to that of the conventional theoretical lower bound approach. The bound is derived by the assumption that the atoms are distributed as an i.i.d. random variable in each frame.

As the present invention has been shown and described with reference to preferred embodiments thereof, those skilled in the art will recognize that the above and other changes may be made therein without departing from the spirit and scope of the invention.

What is claimed is:

1. Method for encoding video data, comprising the following steps:
   obtain the digital file of an original image to be processed;
   process the image with estimation to obtain an approximation of said image, represented by motion vectors;
   calculate the difference between said original image and said approximation to obtain a residual image;
   obtain the bit plans of said residual image, represented by quadtrees;
   process said quadtrees with estimation to obtain an estimation quadtree file;
   calculate the difference between quadtrees of said residual image and quadtrees of said estimation to obtain a difference quadtree file;
   encoding quadtrees of said estimation quadtree file and said difference quadtree file; and
   output said motion vectors and data of said encoded quadtrees.

2. The method according to claim 1, wherein estimation of said original image comprises a matching pursuit processing and said motion vectors comprise inner product values and atoms provided in a related dictionary that represent said approximation.

3. The method according to claim 1, wherein said step of obtaining bit plains of said residual image comprising a step of distinguish said residual image into a base layer residual image and an enhanced layer residual image according to quality of image and a step of obtaining bit plains of said base layer residual image and bit plains of said enhanced layer residual image respectively, and wherein encoding processes of said bit plains is conducted in respect to bit plains of said base layer residual image and bit plains of said enhanced layer residual image respectively.

4. The method according to claim 1, wherein estimation of said quadtrees comprising estimating quadtree data of a bit plain with quadtree data of a previous bit plain belonging to the same image frame.

5. The method according to claim 1, wherein estimation of said quadtrees comprising estimating quadtree data of a bit plain with quadtree data of a corresponding bit plain belonging to a previous image frame relative.

6. The method according to claim 3, wherein estimation of said quadtrees when encoding said enhanced layer residual image comprising estimating quadtree data of a bit plain with union of quadtree data of all previous bit plains belonging to the same image frame and wherein estimation of said quadtrees when encoding said base layer residual image comprising estimating quadtree data of a bit plain with quadtree data of a corresponding bit plain belonging to a previous image frame relative.

7. Method for decoding video data, comprising the following steps:
  obtain video data comprising motion vectors of an image frame representing an approximation of image and codes representing quadtrees of bit plains of an residual image related to said approximation; wherein codes representing quadtrees of bit plains of said residual image comprise codes representing an estimation quadtree and codes representing a difference quadtree;
  decode said code representing quadtrees to obtain bit plain data of said residual image;
  resume said residual image;
  decode said motion vectors to resume said approximation of image; and
  combine said residual image and said approximation to obtain an originalimage.

8. The method according to claim 7, wherein said motion vectors comprise inner product values and atoms provided in a related dictionary that represent said approximation.

9. Device for encoding video data, comprising:
  a motion estimation means to process an original image with estimation to obtain an approximation of said image, represented by motion vectors; and
  a first encoder to calculate differences between said original image and said approximation to obtain a residual image and to obtain bit plains of said residual image to be represented by quadtrees; and
  a second encoder to process said quadtrees with estimation to obtain an estimation quadtree and a difference quadtree and to encode said estimation quadtrees and said difference quadtrees.

10. The device according to claim 9, wherein estimation of said original image by said motion estimation means comprises a matching pursuit processing and said motion vectors comprise inner product values and atoms provided in a related dictionary that represent said approximation.

11. The device according to claim 9, wherein said first decoder distinguishes said residual image into a base layer residual image and an enhanced layer residual image according to quality of image and obtains bit plains of said base layer residual image and bit plains of said enhanced layer residual image respectively, and encodes bit plains of said base layer residual image and bit plains of said enhanced layer residual image respectively.

12. The device according to claim 9, wherein said second decoder estimates quadtree data of a bit plain with quadtree data of a previous bit plain belonging to the same image frame.

13. The device according to claim 9, wherein said second decoder estimates quadtree data of a bit plain with quadtree data of a corresponding bit plain belonging to a previous image frame relative.

14. The device according to claim 11, wherein said second decoder estimates quadtree data of a bit plain with union of quadtree data of all previous bit plains belonging to the same image frame, when encoding said enhanced layer residual image, and estimates quadtree data of a bit plain with quadtree data of a corresponding bit plain belonging to a previous image frame relative, when encoding said base layer residual image.

15. Device for decoding video data to decode encoded video data; wherein said video data comprise motion vectors of an image frame representing an approximation of image and codes representing quadtrees of bit plains of an residual image related to said approximation; wherein codes representing quadtrees of bit plains of said residual image comprise codes representing an estimation quadtree and codes representing a difference quadtree; characterized in that said device decodes said code representing quadtrees to obtain bit plain data of said residual image to resumes said residual image, decodes said motion vectors to resume said approximation of image; and combines said residual image and said approximation to obtain an original image.

16. The device according to claim 15, wherein said motion vectors comprise inner produce values and atoms provided in a related dictionary that represent said approximation.

* * * * *